United States Patent Office 2,786,073
Patented Mar. 19, 1957

2,786,073

ALLYL HYDROXY ALKENOATES

Harry A. Stansbury, Jr., South Charleston, and Howard R. Guest, Charleston, W. Va., assignors to Union Carbide and Carbon Corporation, a corporation of New York No Drawing. Application January 19, 1955, Serial No. 482,882

9 Claims. (Cl. 260—484)

This invention relates to the production of certain doubly unsaturated esters that are useful as monomers in various polymerization processes. More particularly the invention relates to a novel group of allyl alkenoates and to a method of making the same.

The compounds of the present invention correspond to the general formula:

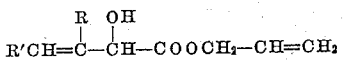

wherein R is selected from the group consisting of hydrogen, chlorine and alkyl radicals containing from 1 to 4 carbon atoms and R' is selected from the group consisting of hydrogen and alkyl radicals having from 1 to 4 carbon atoms. These compounds are characterized by the fact that they have two ethylenic double bonds, one in the allyl group and one in the alkenoate group; and this characteristic makes the compounds especially useful for the preparation of highly cross-linked polymers. For example, it has been found that these allyl esters can be copolymerized with vinyl chloride and that when they are copolymerized one double bond becomes a part of the polymer chain whereas the other double bond does not participate in the polymerization reaction. The unreacted double bond, which may be called a "pendant" double bond, is available for subsequent cross-linking of the polymer chains, and the cross-linking can be effected by heating the polymer in the presence of a catalyst to form a tough, insoluble resin.

It should be noted that the secondary hydroxyl group does not enter into the polymerization reaction described above and hence the cross-linked copolymer has free hydroxyl groups that enhance its compatibility with certain other types of polymers e. g. the alkyd resins. Moreover these hydroxyl groups also impart anti-static properties to the polymers and copolymers.

The present compounds can be conveniently made by using unsaturated aldehydes such as acrolein, methacrolein, 2-chloroacrolein and crotonaldehyde as starting materials. Acrolein and methacrolein can be prepared in known manner by the catalytic oxidation of propylene and isobutylene respectively. 2-chloroacrolein is readily produced by chlorinating acrolein to form 2,3 dichloropropionaldehyde which is treated with boiling water to give 2-chloroacrolein according to the following equation:

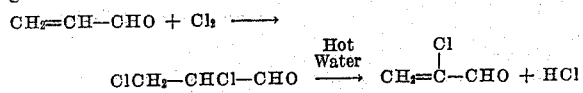

Crotonaldehyde can be prepared by a method analogous to that indicated for acrolein or by condensation of acetaldehyde to form acetaldol with subsequent dehydration to give crotonaldehyde.

In preparing the present compounds the unsaturated aldehyde is treated with hydrogen cyanide in the presence of a suitable catalyst to convert it into the corresponding cyanohydrin which is then reacted with allyl alcohol in the presence of hydrogen chloride and a limited amount of water to form an ester according to the following equations:

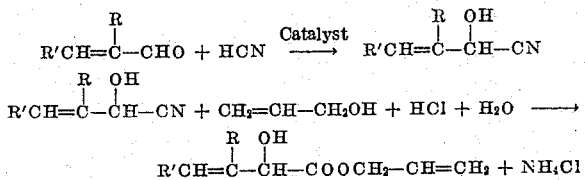

Since only a limited amount of water is used the ammonium chloride formed precipitates and can be readily separated by filtration. The filtrate is essentially composed of the crude ester which can be refined by distillation.

As indicated above the starting materials for the preparation of the present allyl esters may conveniently be 2-alkenals which may be either unsubstituted or may be substituted with halogen or a lower alkyl radical at the "2" position. In order to point out more fully the nature of the present invention the following specific examples are given of the way in which typical aldehydes falling within this class can be converted into the novel allyl alkenoates of the present invention:

EXAMPLE 1

*Preparation of allyl 2-hydroxy-3-butenoate*

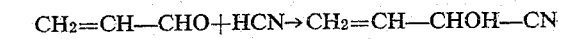

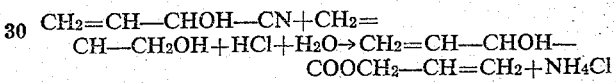

A mixture of 162 gms. of hydrogen cyanide (6 moles) and 2 gms. of potassium cyanide catalyst was stirred at —5° C. while 365 gms. of 92% acrolein (6 moles) were fed thereto over a period of 1.5 hours. After a reaction period of 15 minutes at —5° C., the resulting crude acrolein cyanohydrin was acidified with 4 cc. of concentrated hydrochloric acid.

A solution of 1740 gms. of allyl alcohol (30 moles), 54 gms. of water (3 moles) and 374 gms. of hydrogen chloride (10.2 moles) was stirred at 40–50° C. while one-half of the crude acrolein cyanohydrin (3 moles) was fed thereto over a period of 25 minutes. The mixture was refluxed at 69° C. for 2 hours to complete the reaction. Thereafter the ammonium chloride formed in the course of the reaction was separated by filtration and the filtrate was distilled under reduced pressure to obtain allyl 2-hydroxy-3-butenoate having the following properties: boiling range 47–49° C. at 2 mm. absolute, refractive index 30/D 1.4490, specific gravity at 20/20° 1.052, 100.2% purity by analytical saponification, 94.5% purity by analytical bromination. The overall yield of this new ester was 80% based on acrolein.

EXAMPLE 2

*Preparation of allyl 2-hydroxy-3-methyl-3-butenoate*

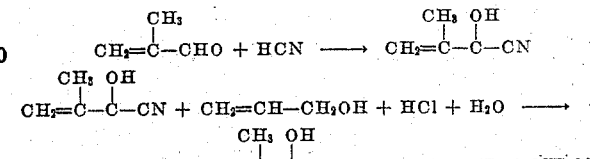

A mixture of 81 gms. of hydrogen cyanide (3 moles) and 1 gm. of potassium cyanide catalyst was stirred at 18° C. while 219 gms. of 98.8% methacrolein (3 moles) were fed thereto over a period of 40 minutes. After a reaction period of 15 minutes at 18° C., the resulting crude cyanohydrin was acidified with 2 cc. of concentrated hydrochloric acid.

A solution of 1740 gms. of allyl alcohol (30 moles), 54 gms. of water (3 moles) and 187 gms. of hydrogen chloride (5.2 moles) was stirred at 40–50° C., while the crude methacrolein cyanohydrin (3 moles) was added thereto over a period of 20 minutes. The mixture was then refluxed at 75° C. for 1.6 hours, cooled and filtered to remove ammonium chloride. The filtrate was fractionated under reduced pressure to isolate allyl 2-hydroxy-3-methyl-3-butenoate having the following properties: boiling range 58–59° C./2 mm., refractive index 30/D 1.4470, specific gravity 20/20° 1.017, 106.7% purity by analytical saponification, 92.6% purity by analytical bromination. The yield of ester was 51% based on methacrolein.

EXAMPLE 3

*Preparation of allyl 2-hydroxy-3-chloro-3-butenoate*

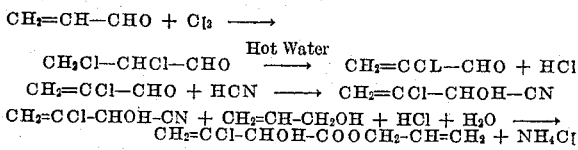

A mixture of 251 gms. of 89.3% acrolein (4 moles) in 496 gms. of 1,1,2,2-tetrachloroethane was chlorinated at 0° C. until 283 gms. (4 moles) were absorbed. The crude 2,3-dichloropropionaldehyde solution was fed to 3 liters of water (containing 3 gms. of hydroquinone) refluxing on a still fitted with a brine-cooled condenser and a decanter. The solution was fed over a period of 4 hours while the oil (lower) layer in the decanter was taken off continuously and stored at 0° C. in the presence of hydroquinone inhibitor. The aqueous, upper layer in the decanter was returned as reflux to the column. The steam-distillation was continued for 30 minutes after the feed was added to exhaust all of the oil from the condensate. The collected oil (823 gms.) was 41.5% 2-chloroacrolein by analysis using the mercural method for aldehyde. This corresponded to an over-all yield of 94% based on acrolein.

The steam-distilled solution of 41.5% 2-chloroacrolein in tetrachloroethane (823 gms. containing 3.77 moles of 2-chloroacrolein) was mixed with 112 gms. of hydrogen cyanide (4.15 moles, 10% excess). This mixture was fed to a solution of 7.7 gms. (.04 equivalent) of mixed alkyl pyridines having an average equivalent weight of 194, in 100 gms. of tetrachloroethane while stirring at 15–20° C. After a feed period of 1.3 hours and a reaction time of 15 minutes, the mixture was acidified with 5 ml. of 37% hydrochloric acid. The mixture was fractionated under reduced pressure to obtain 2-chloroacrolein cyanohydrin in 75% yield and efficiency.

A mixture of 1480 gms. of allyl alcohol (25.5 moles), 46 cc. of water (2.5 moles), and 249 gms. of dry hydrogen chloride (6.8 moles) was stirred at 45–50° C. while 300 gms. of 2-chloroacrolein cyanohydrin (2.55 moles) were fed thereto over a period of 40 minutes. The mixture was stirred and refluxed for 2 hours to complete the reaction. The salt was removed by filtration and the filtrate was fractionated under reduced pressure to obtain allyl 3-chloro-2-hydroxy-3-butenoate having the following properties: boiling point 75° C./5 mm., refractive index 30/D 1.4700, specific gravity 20/20° 1.194, molecular weight by the Menzies-Wright method 174.5 (theory 176.5), 20.0% chlorine (theory 20.1% Cl), 47.5% carbon (theory 47.6% C.), 5.5% hydrogen (theory 5.1% H), 108% purity by analytical bromination (assuming only one reactive double bond). The yield and efficiency were 67% based on 2-chloroacrolein cyanohydrin.

EXAMPLE 4

*Preparation of allyl 2-hydroxy-3-pentenoate*

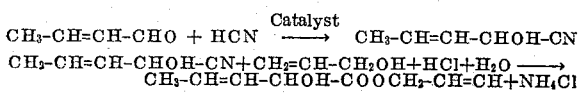

A mixture of 525 gms. (7.5 moles) of crotonaldehyde and 6.2 gms. of triamylamine catalyst was stirred at 23–28° while 223 gms. (8.2 moles) of hydrogen cyanide were fed over a period of 28 minutes. After an additional reaction period of 45 minutes at the same temperature, the formation of the cyanohydrin was considered complete.

A solution of 1740 gms. (30 moles) of allyl alcohol, 54 gms. (3 moles) of water, and 385 gms. (10.2 moles) of hydrogen chloride was stirred at 40–50° C. while one-half of the crude crotonaldehyde cyanohydrin (3.75 moles) was fed over a period of 25 minutes. The mixture was refluxed for 2 hours to complete the reaction. After the ammonium chloride was separated by filtration, the filtrate was distilled under reduced pressure to obtain 268 gms. of allyl 2-hydroxy-3-pentenoate having the following properties: boiling point 80° C. at 5 mm., refractive index 30/D 1.4561, 101% purity by analytical saponification. The elemental analysis of the product was as follows: carbon 61.31, 61.31; hydrogen 7.74, 7.83; as compared with calculated values for $C_8H_{12}O_3$ of carbon 61.45, hydrogen 7.74. The yield of ester was 46% based on crotonaldehyde.

It is of course to be understood that the foregoing examples are illustrative only and that numerous changes can be made in the reactants and procedures described without departing from the spirit of the invention as set forth in the appended claims.

We claim:

1. As a new composition of matter, an allyl alkenoate responding to the general formula:

$$\begin{array}{cc} R & OH \\ | & | \\ R'CH=C-CH-COOCH_2-CH=CH_2 \end{array}$$

wherein R is selected from the group consisting of hydrogen, chlorine and alkyl radicals having from 1 to 4 carbon atoms and R′ is selected from the group consisting of hydrogen and alkyl radicals having from 1 to 4 carbon atoms.

2. As a new composition of matter, an allyl 2-hydroxy-3-alkenoate containing up to 5 carbon atoms in the alkenoate radical.

3. As a new composition of matter, allyl 2-hydroxy-3-butenoate.

4. As a new composition of matter, allyl 2-hydroxy-3-chloro-3-butenoate.

5. As a new composition of matter, allyl 2-hydroxy-3-methyl-3-butenoate.

6. As a new composition of matter, allyl 2-hydroxy-3-pentenoate.

7. The method of making an allyl alkenoate which comprises reacting an aldehyde having the general formula:

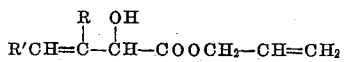

wherein R and R′ are defined as in claim 1 with hydrogen cyanide in the presence of a basic catalyst to form a cyanohydrin and reacting the resulting cyanohydrin with allyl alcohol, hydrogen chloride and water to produce an allyl 2-hydroxy-3-alkenoate.

8. A method according to claim 7 and wherein the reaction between the aldehyde and the hydrogen cyanide is carried out in the presence of potassium cyanide as a catalyst.

9. The method of making an allyl 2-hydroxy-3-alkenoate which comprises reacting a cyanohydrin having the general formula

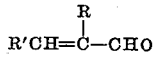

wherein R and R′ are defined as in claim 1, with allyl alcohol, hydrogen chloride and water.

References Cited in the file of this patent

UNITED STATES PATENTS

| | | |
|---|---|---|
| 2,232,943 | Gudgeon et al. | Feb. 25, 1941 |
| 2,494,880 | Kelley et al. | Jan. 17, 1950 |